Figure 1:
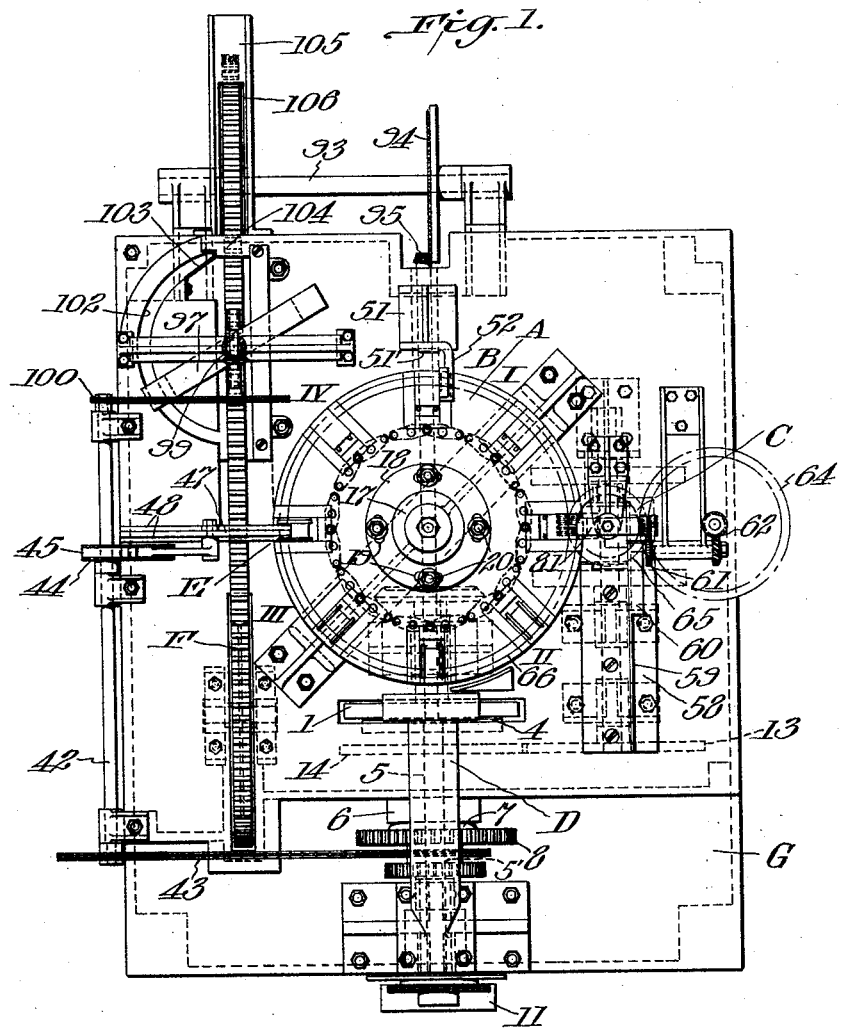

March 11, 1930.  L. E. PARKER  1,750,281

MACHINE FOR ASSEMBLING BOOK MATCHES

Filed April 6, 1927  13 Sheets-Sheet 1

Inventor:
Lucian E. Parker
by
Wm H. Fincel
Attorney.

Fig.4.

March 11, 1930.  L. E. PARKER  1,750,281
MACHINE FOR ASSEMBLING BOOK MATCHES
Filed April 6, 1927   13 Sheets-Sheet 5

Inventor
Lucian E. Parker
by
W. H. Finckel
Attorney

March 11, 1930.   L. E. PARKER   1,750,281
MACHINE FOR ASSEMBLING BOOK MATCHES
Filed April 6, 1927   13 Sheets-Sheet 7

March 11, 1930.　　　　L. E. PARKER　　　　1,750,281
MACHINE FOR ASSEMBLING BOOK MATCHES
Filed April 6, 1927　　　13 Sheets-Sheet 8

Inventor
Lucian E. Parker
by
Wm. N. Finckel
Attorney

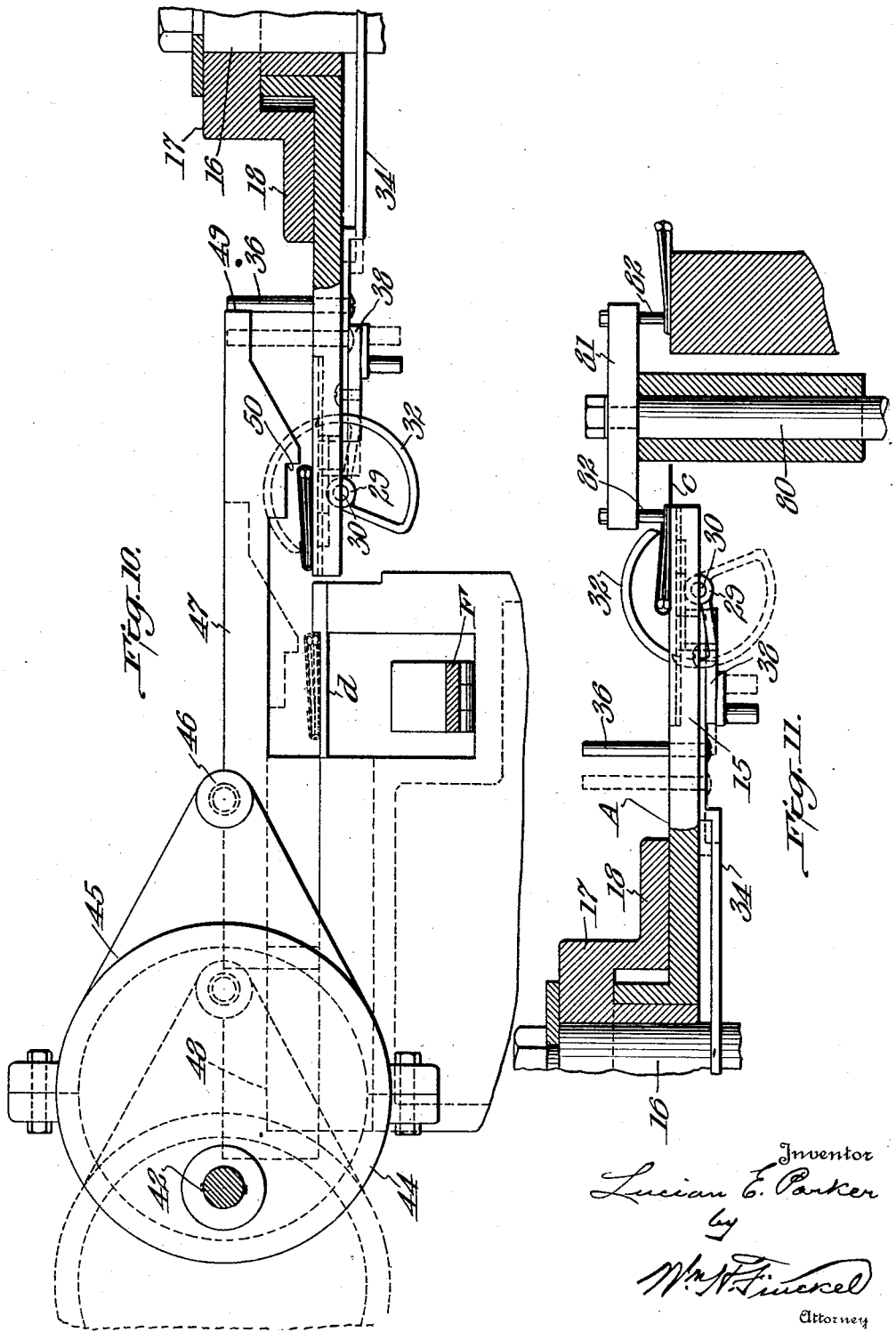

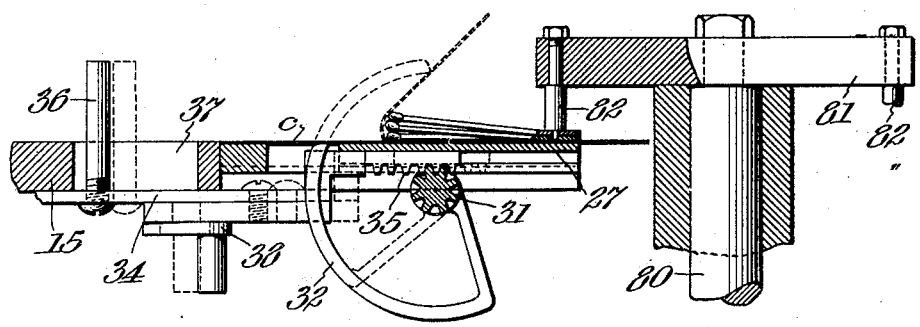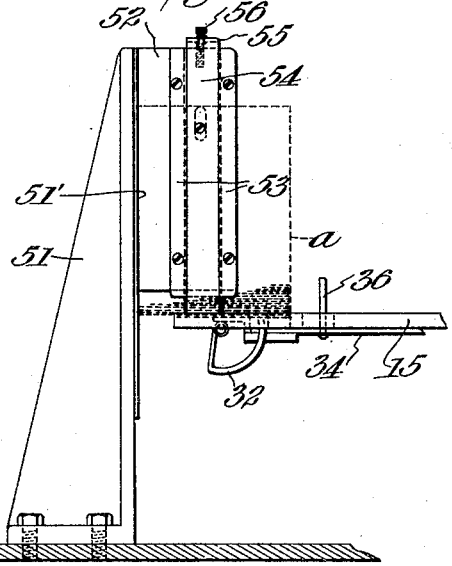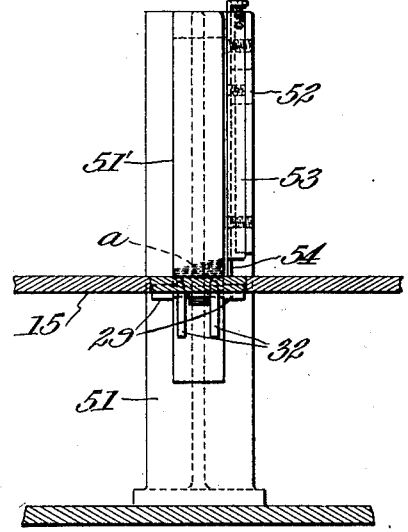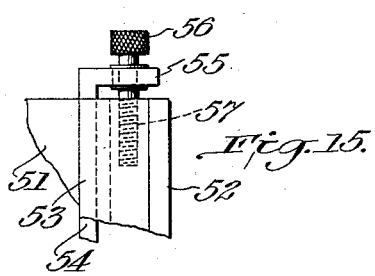

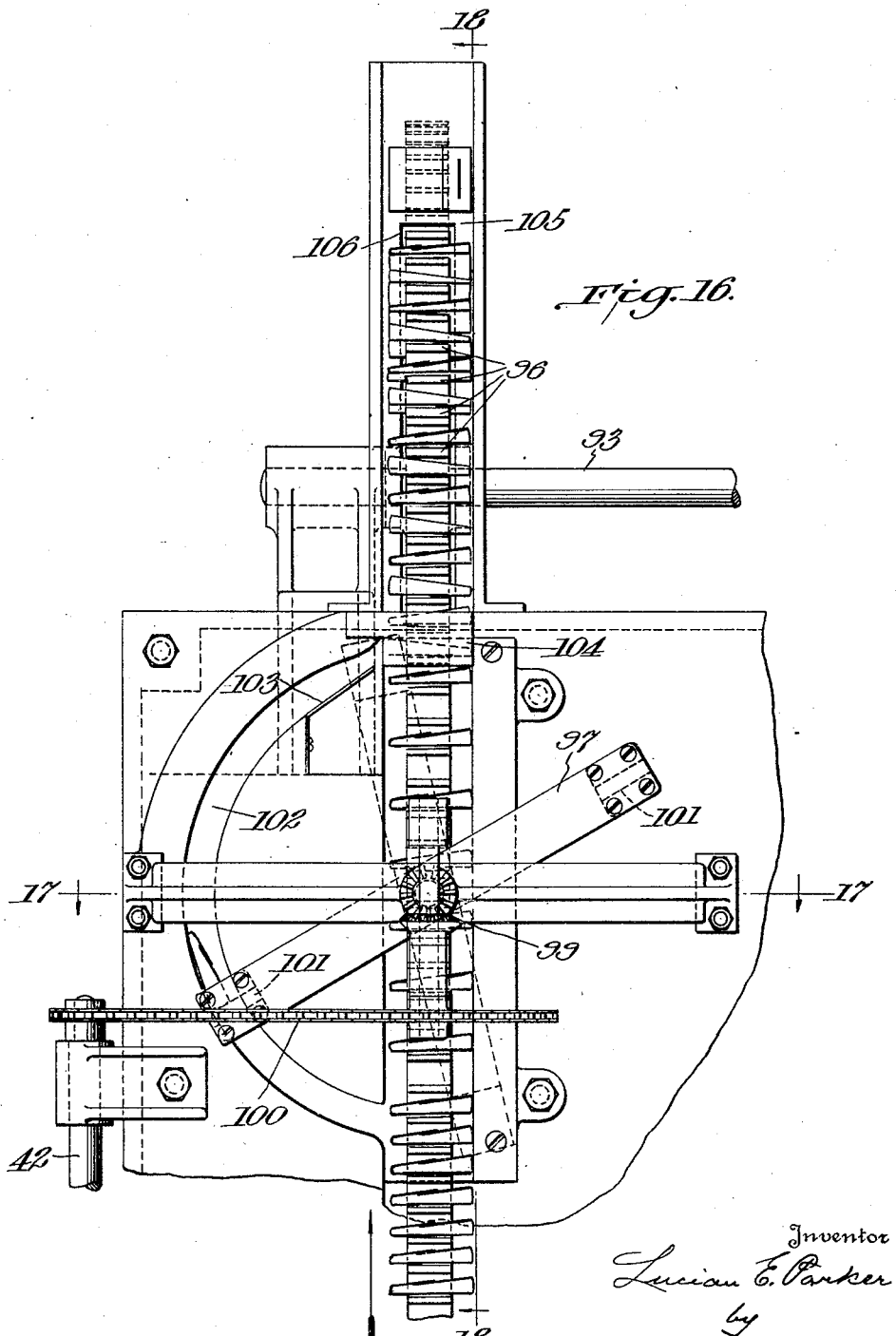

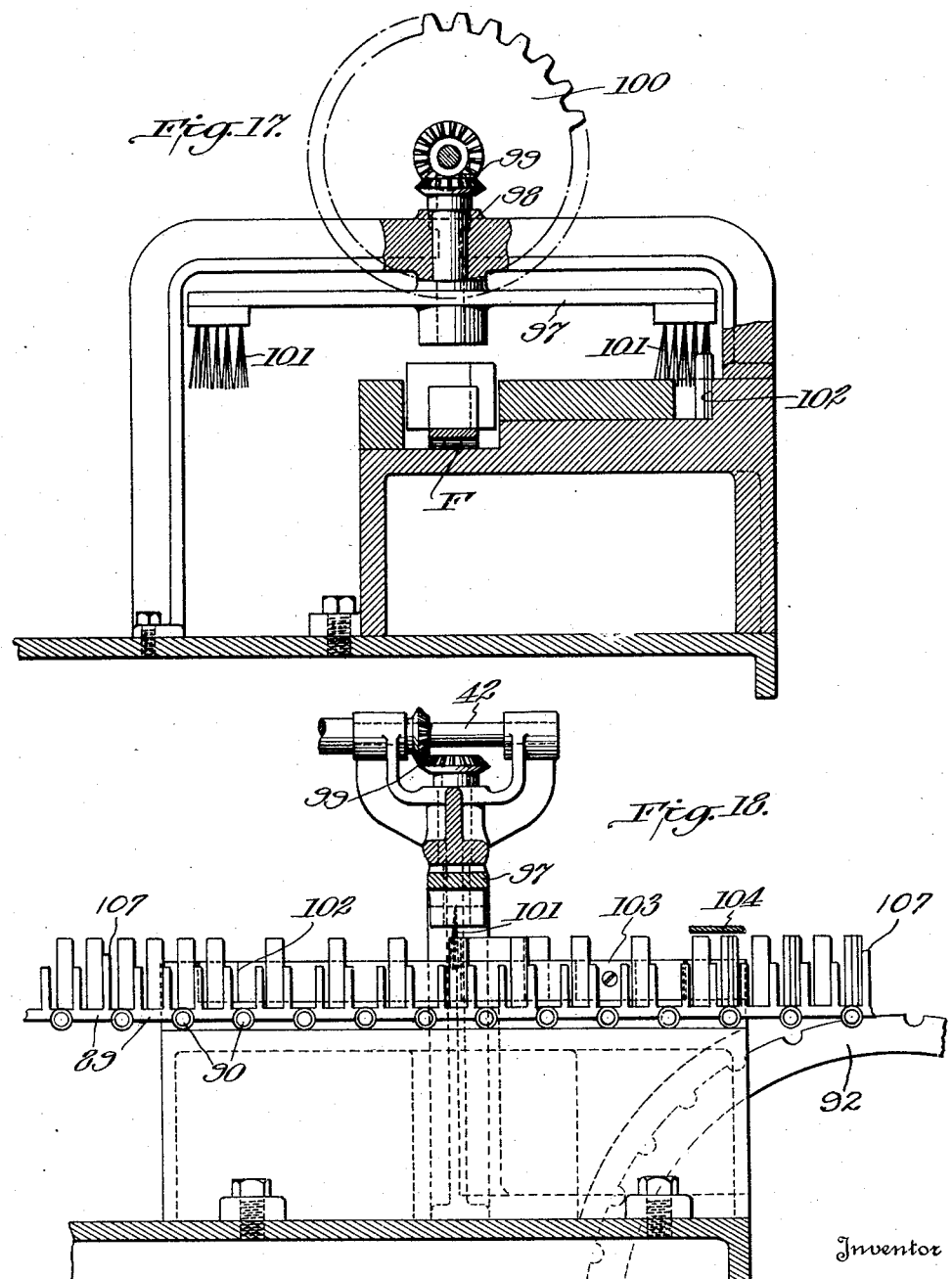

March 11, 1930. L. E. PARKER 1,750,281
MACHINE FOR ASSEMBLING BOOK MATCHES
Filed April 6, 1927 13 Sheets-Sheet 13
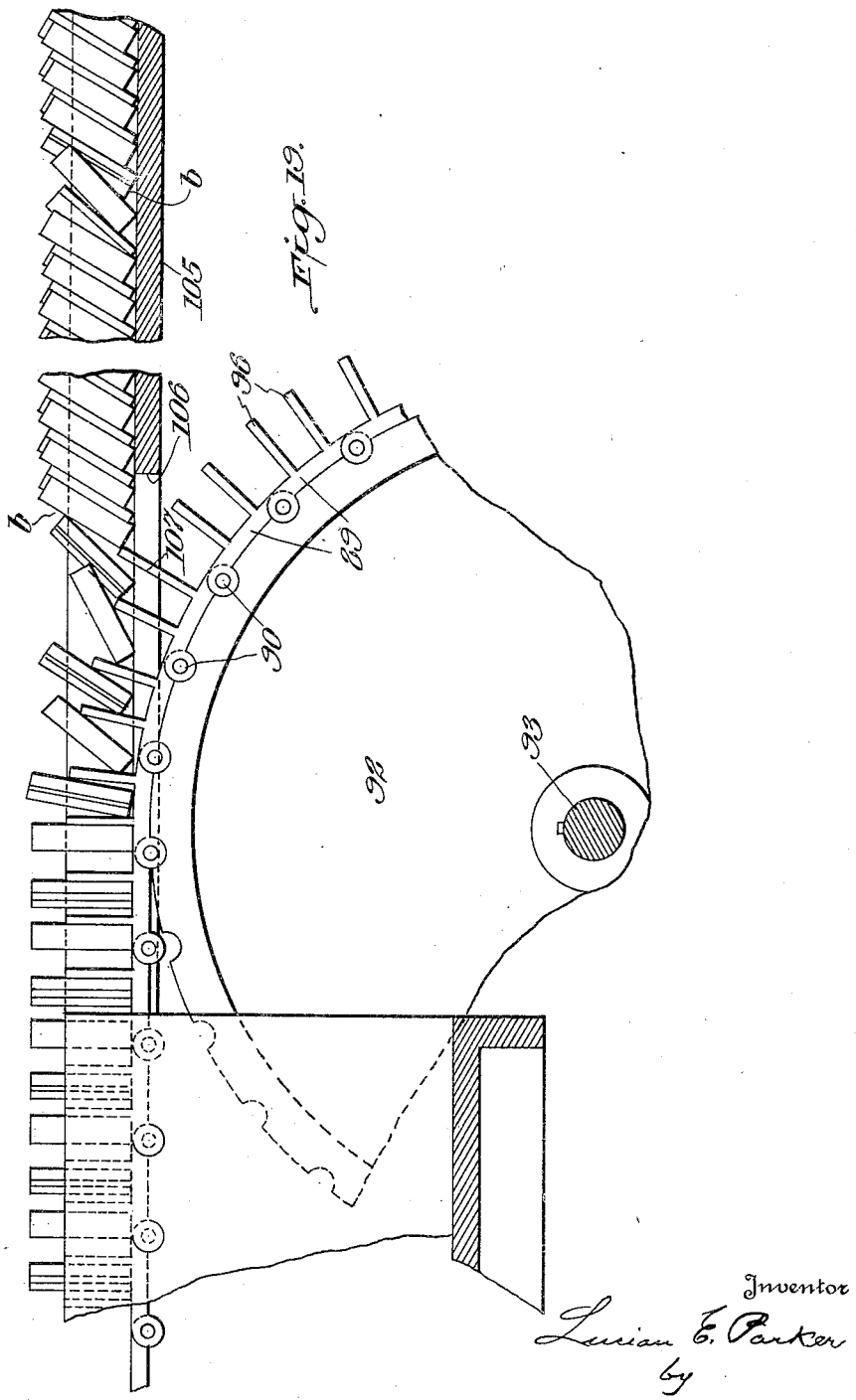

Patented Mar. 11, 1930

1,750,281

UNITED STATES PATENT OFFICE

LUCIAN E. PARKER, OF WADSWORTH, OHIO, ASSIGNOR TO THE OHIO MATCH COMPANY, OF WADSWORTH, OHIO, A CORPORATION OF OHIO

MACHINE FOR ASSEMBLING BOOK MATCHES

Application filed April 6, 1927. Serial No. 181,478.

This invention relates to a machine for assembling book matches, that is, a machine which will automatically feed cover blanks, sever predetermined numbers of matches from a strip of same to form match cards, place such cards of matches on the fed cover blanks, fold the blanks upon the match cards into the familiar book form, staple the covers and matches together, and convey the finished books of matches to a packing table or the like, the match books being arranged alternately end-for-end so as to stack evenly, and being separated into multiples of twenty-five, or other desired multiples, to facilitate handling for packing.

One object of the invention is to provide a machine of the character described by means of which all of the above-mentioned functions are carried out continuously and automatically, the only manual attention necessary for its proper operation being the supplying of the cover blanks and cards of matches in appropriate quantities.

Another object of the invention is to provide a machine capable of performing all of the functions recited, which may be of relatively small size, thereby economizing in floor space.

The invention consists, broadly, in a machine for assembling book matches, comprising a movable carrier, means for imparting a predetermined movement to said carrier, means for feeding cover blanks to the carrier, means for severing match strips into card lengths each containing a predetermined number of matches, means for feeding the thus severed cards of the match strips to the cover blanks upon the carrier, means for appropriately folding the covers upon the matches, means for stitching or stapling the covers to the match cards therein, means for discharging the finished books of matches from the carrier, and a travelling conveyor for receiving the discharged books, all of these means being located in operative relation to the carrier and operating in timed relation to the movement thereof, as I will proceed now to explain and finally claim.

Figure 2:
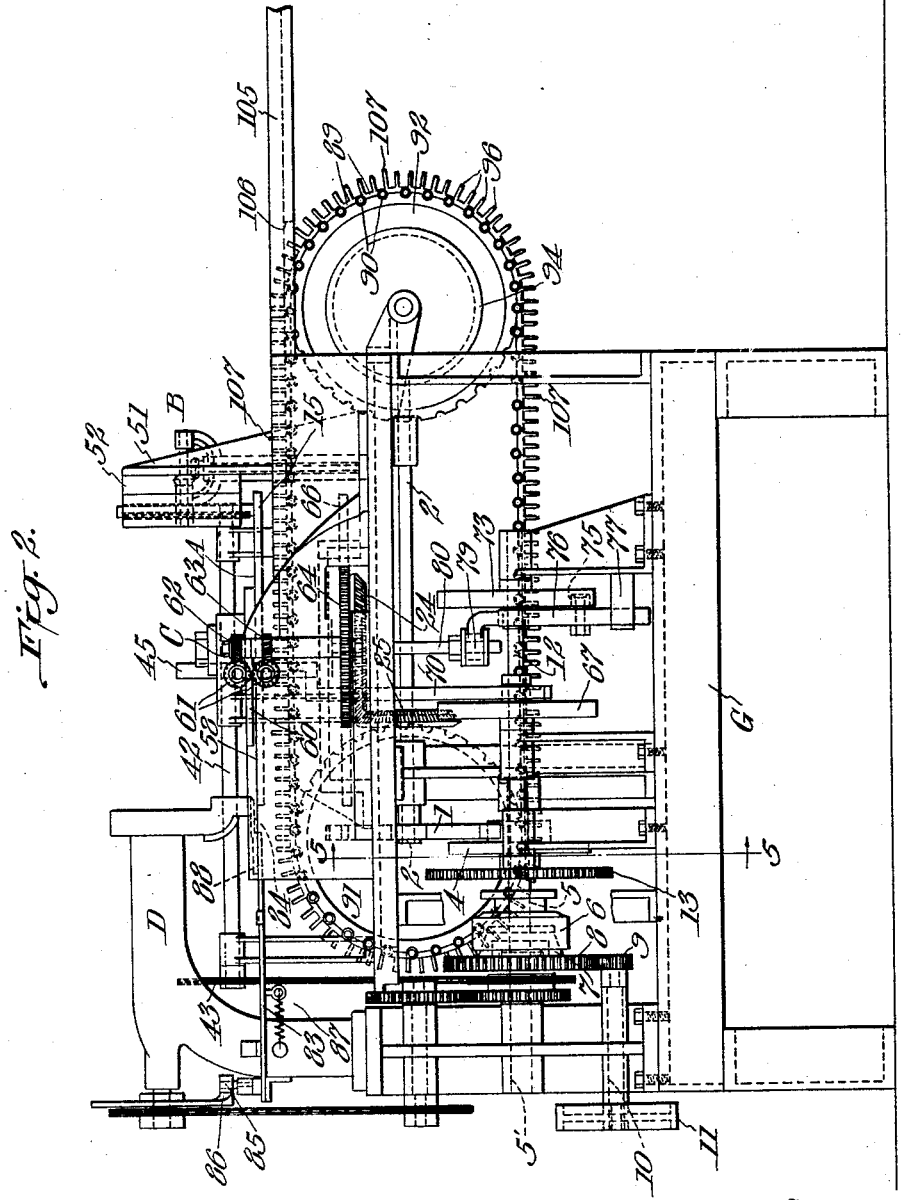
Figure 3:
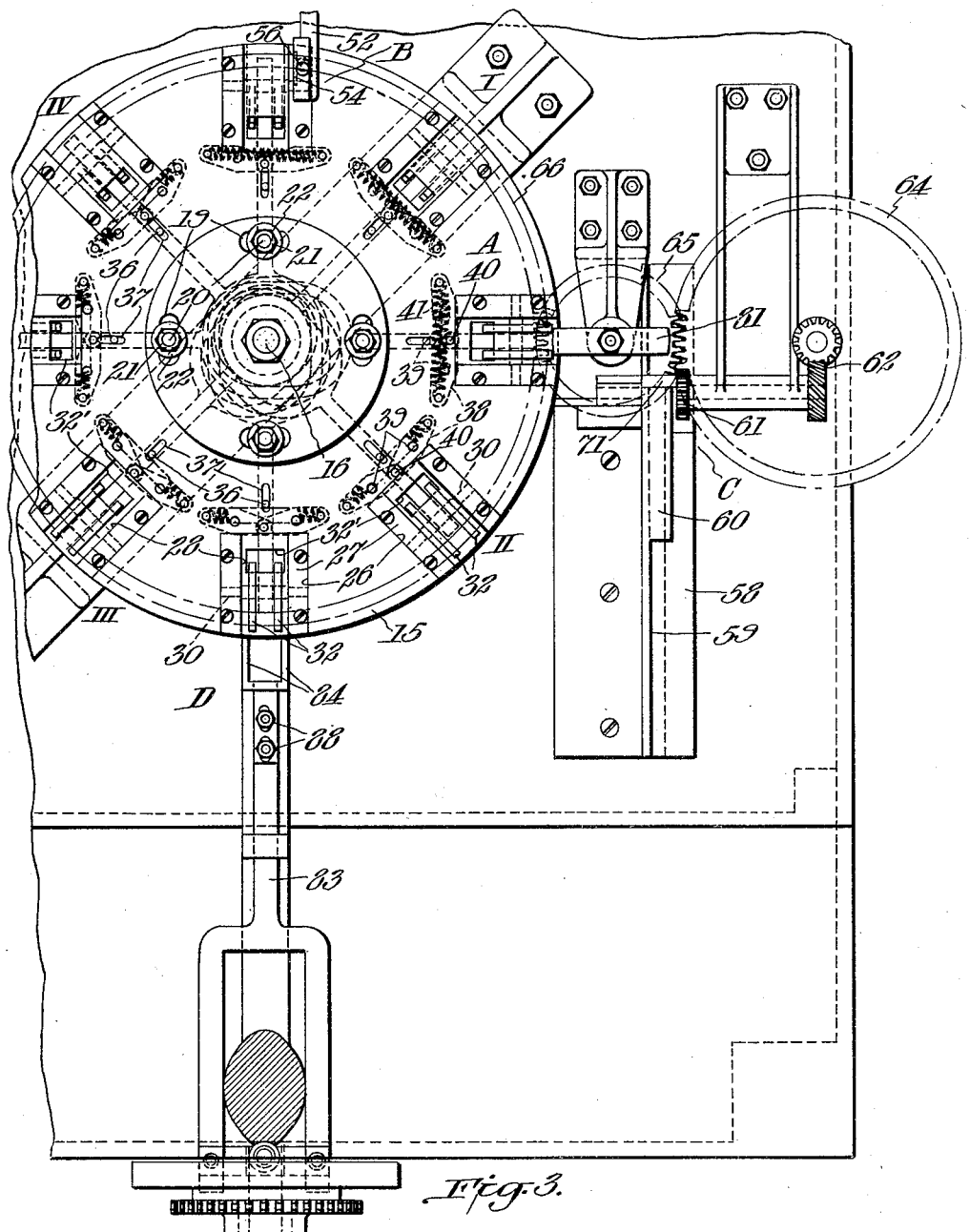
Figure 5:
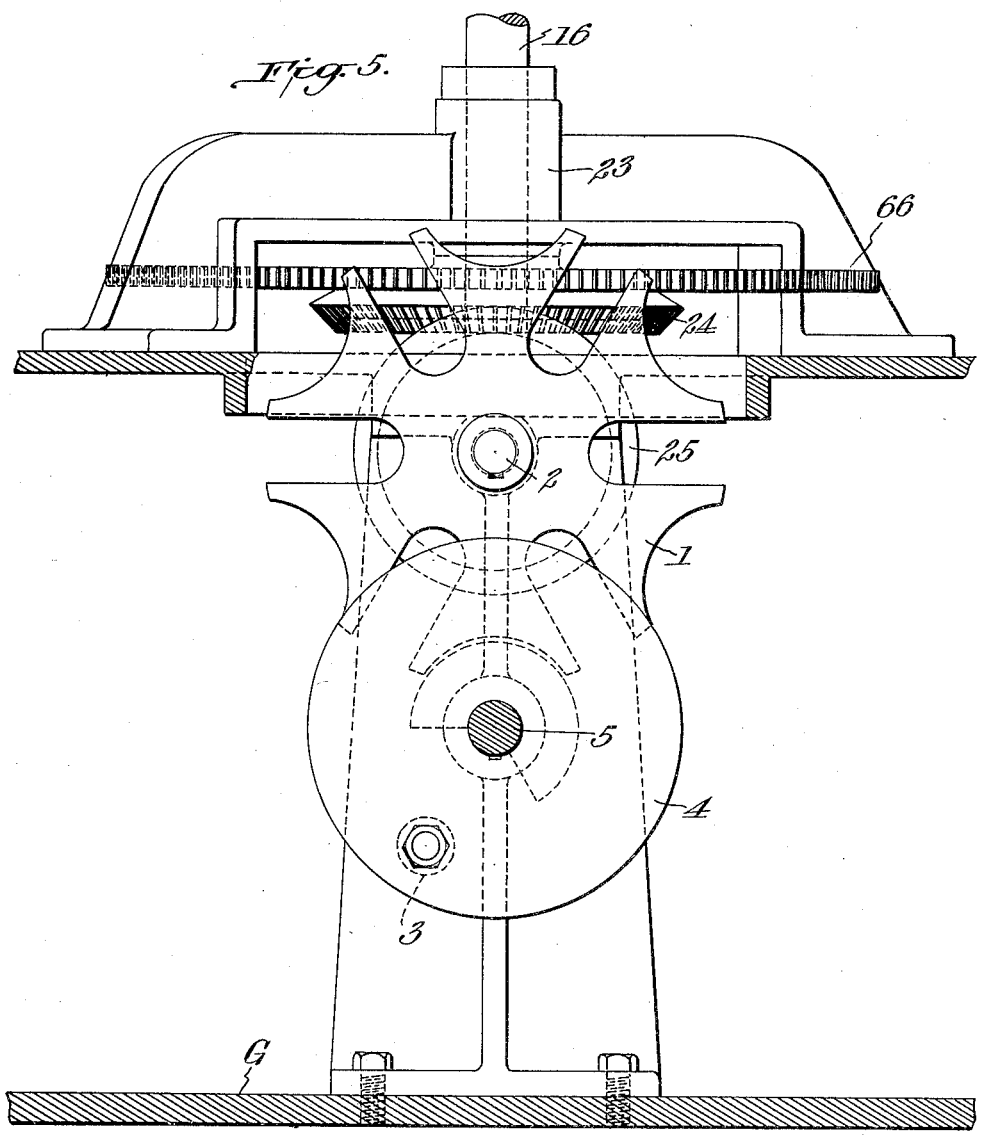
Figure 6:
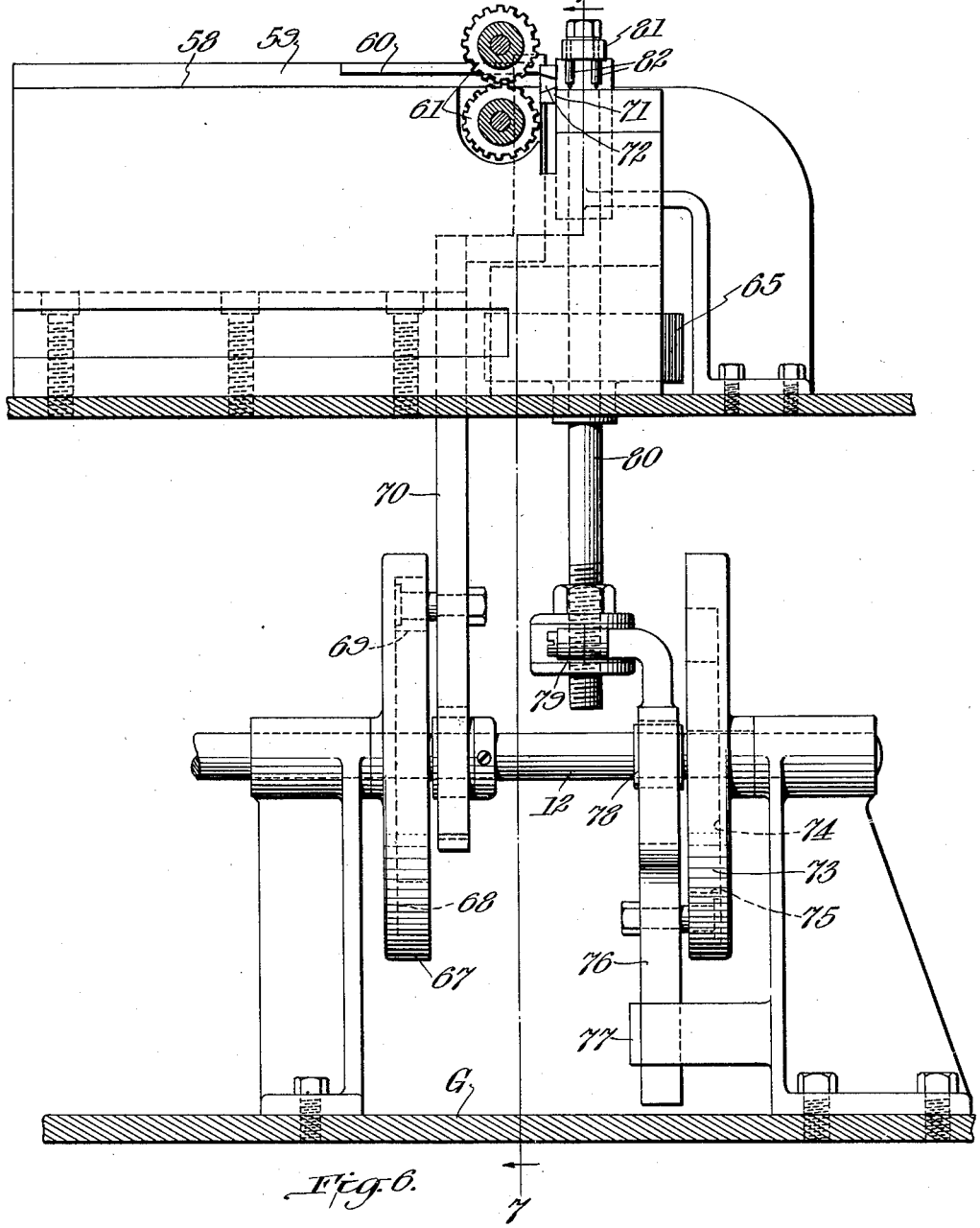
Figure 7:
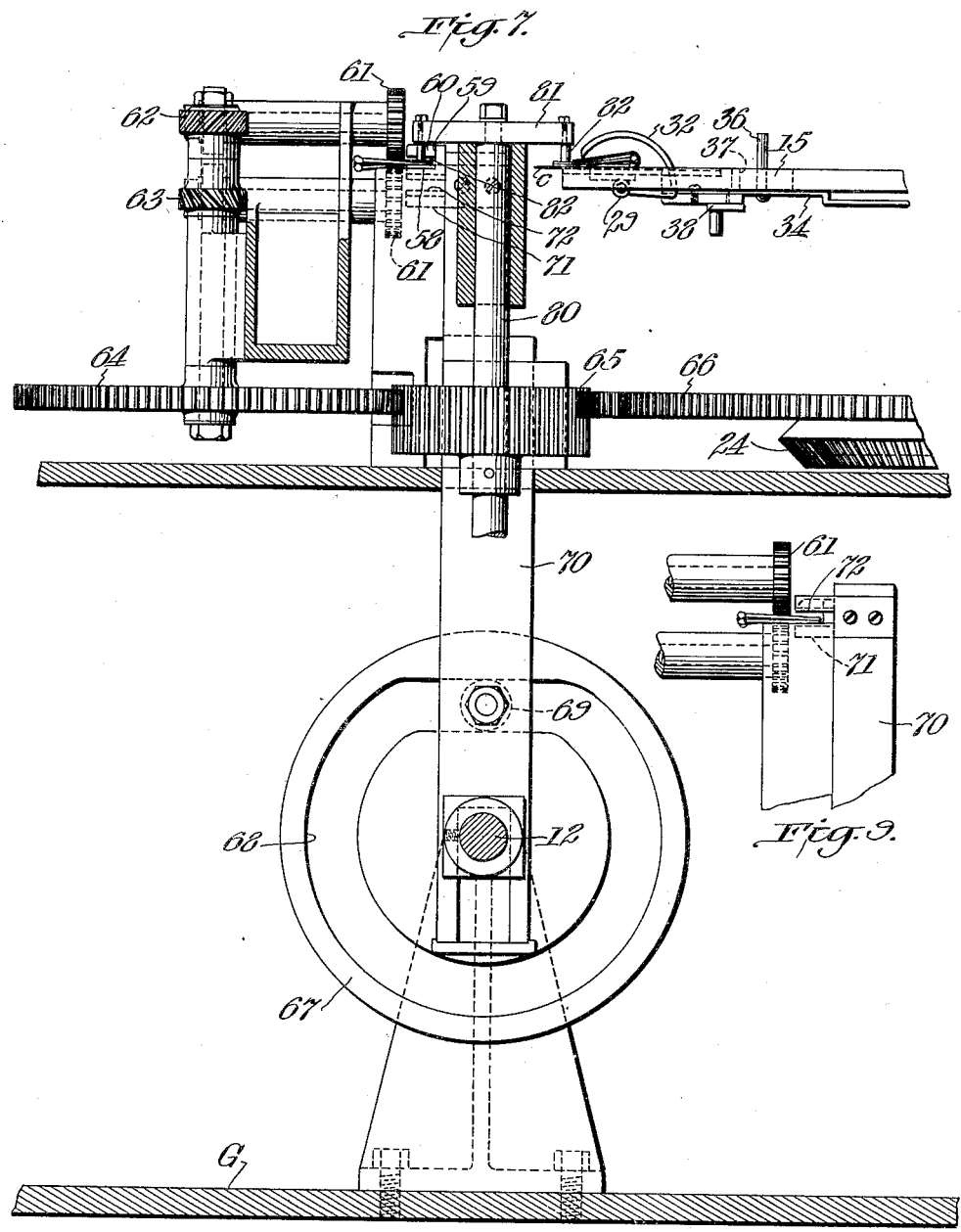
Figure 8:
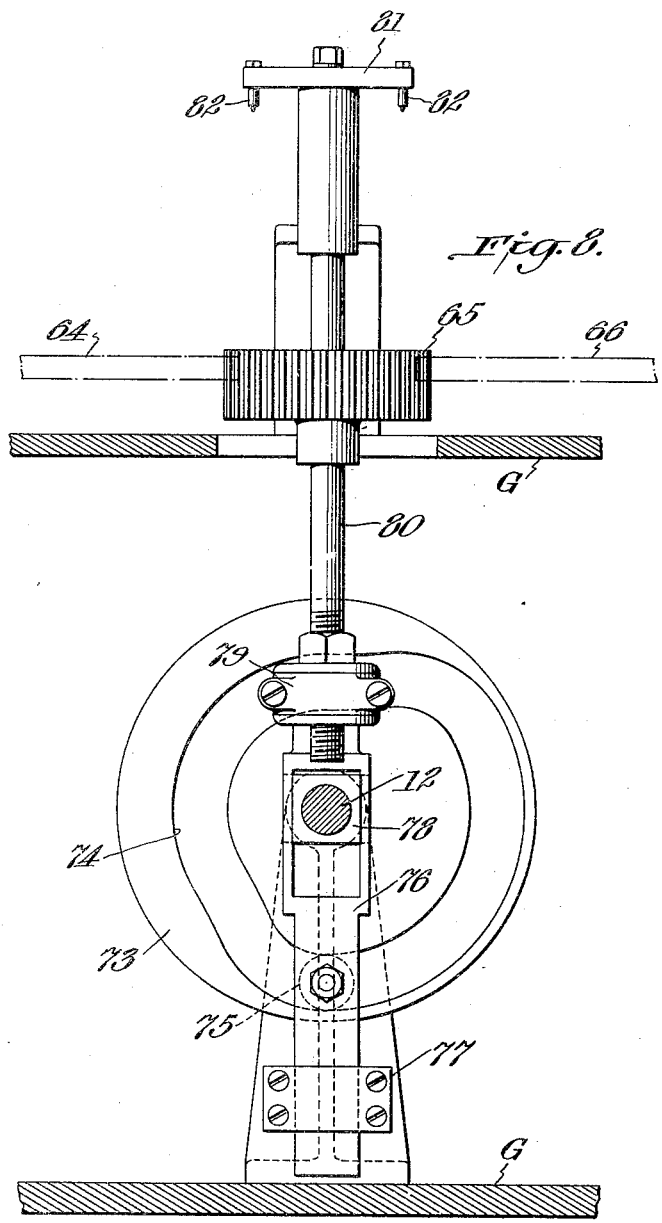

In the accompanying drawings illustrating the invention, in the several figures of which like parts are similarly designated, Figure 1 is a plan view of the machine. Fig. 2 is a side elevation thereof, looking at the right-hand side of Fig. 1. Fig. 3 is an enlarged fragmentary plan view of the carrier and the match-card severing and positioning station, parts of the stitching or stapling mechanism being shown. Fig. 4 is an enlarged bottom view of the carrier showing the operating mechanism for the cover folding and retaining means. Fig. 5 is an enlarged fragmentary sectional elevation of the main driving mechanism for the carrier and its associated mechanism, taken on line 5—5 of Fig. 2. Fig. 6 is an enlarged fragmentary sectional side elevation of the match-card severing mechanism and associated parts. Fig. 7 is an enlarged fragmentary sectional elevation taken on the line 7—7 of Fig. 6 looking toward the left, but with the cam moved through approximately 90°. Fig. 8 is a fragmentary sectional elevation taken on line 7—7 of Fig. 6, but looking toward the right. Fig. 9 is a fragmentary view of the match-card feeding and severing mechanism shown in Figs. 6 and 7, the parts being shown in different positions. Figs. 10 and 11, taken together, present a greatly enlarged sectional elevation of the carrier and a portion of the devices associated therewith for operating upon the cards of matches and the cover blanks for forming the match books. Fig. 12 is a sectional view of the parts shown in Fig. 11 upon a larger scale. Fig. 13 is a side view, and Fig. 14 a front view of the stop for adjusting a stack of cover blanks relatively to the carrier. Fig. 15 is a detail of the adjusting means for the stop shown in Figs. 13 and 14. Fig. 16 is an enlarged plan of the travelling conveyor and the means associated therewith for turning alternate match books end-for-end. Fig. 17 is a section taken substantially on the line 17—17 of Fig. 16. Fig. 18 is a section taken substantially on the line 18—18 of Fig. 16, but in Figs. 17 and 18 the sweep is shown in a somewhat different position from that in which it is shown in Fig. 16. Fig. 19 is a fragmentary section illustrating the method of and means for spacing the match books in multiples of twenty-five as they are discharged from the conveyor.

The machine of my invention includes as essential elements an intermittently rotatable carrier A, having arranged around and in cooperative relation to it, a stop member B against which a stack of cover blanks is piled upon the carrier and past which the blanks are fed one-by-one to the carrier, a match-card feeding, severing and transferring means C, a stitching or stapling means D of well-known type, and a discharge means E for discharging the finished match books upon a travelling conveyor F. All of these parts are assembled upon and carried by a suitable stand G provided with bearings and brackets for the various parts of the mechanism, as will be hereinafter described.

The carrier A has an intermittent or step-by-step rotary movement, and during each stop made by it during such movement an operation is performed upon the match books or the parts thereof by the associated mechanisms B, C, D, E and F, and hence each of these mechanisms operates intermittently in timed relation to the movement of the carrier A.

This step-by-step or intermittent movement is imparted to the carrier A and conveyor F by means of a Geneva gear 1 carried by a countershaft 2 and deriving motion from a roller 3 carried by a disk 4 mounted upon a driving shaft 5. The shaft 5 is engageable through a clutch member 6 with a complemental clutch member 7 carried by a driving gear 8, and this gear is freely rotatable on an extension 5′ of shaft 5 and is in mesh with a driving pinion 9 mounted on a shaft 10. This shaft 10 is provided with a pulley 11 which latter may be belted to a motor or other suitable source of power. The driving connections between the carrier A and conveyor F and the shaft 2 will be hereinafter explained.

All of the other mechanisms of the machine are driven through suitable connections either with the shaft 5—5′, as will be apparent, or through connections with a shaft 12 driven by means of gears 13 and 14 from the shaft 5.

Referring now particularly to Figs. 3, 4, 5, 10, 11 and 12, it will be seen that the carrier A comprises a disk 15 mounted upon an upright shaft 16 by means of a bearing member 17 keyed to the shaft 16 and provided with a skirt 18 having circumferentially elongated openings 19 through which extend studs 20 carried by the disk 15 and engaged by nuts 21 bearing upon washers 22, so that the disk 15 may be angularly adjusted relatively to the shaft 16 and fixed to the shaft in such adjustment through the instrumentality of the member 17. The shaft 16 is mounted in a bearing 23 and is driven by means of bevel gears 24 and 25, the latter of which turns intermittently with the shaft 2.

The upper face of the disk 15 is provided with a plurality (preferably eight) of recesses 26, and in each of these recesses is mounted a machined plate 27 having a depression 28 in its upper face of a width and depth to so receive a cover blank that the upper face of the blank is just flush with the upper face of the plate 27 and is restrained against lateral movement with respect thereto.

Each of the plates 27 carries upon its under face a pair of bearings 29 in which is supported a shaft 30 formed with a pinion 31 and carrying a pair of fingers 32 arranged to be projected through an aperture 32′ in the plate 27, as will be described.

Carried in slide-bearings 33 on the under surface of the disk 15 are four slide bars 34 each of which carries at each of its ends a rack 35 in engagement with one of the pinions 31, and is further provided adjacent to each end with a pin 36 extending upwardly through a complemental slot 37 in the disk 15. These pins 36 furnish the means whereby sliding movement may be imparted to the bars 34, as will later appear.

In order that the bars may be held in the positions to which they have been moved, I provide spring retained toggles having arms 38 pivoted at 39 to the disk 15 and having their adjacent ends connected to each other and to the slide bars 34 at 40 and their free ends connected by relatively stiff springs 41.

Referring now to Figs. 1, 2, 10, 11 and 12, it will be seen that at the left-hand side of the machine, as viewed in Fig. 1, I mount a shaft 42 driven by chain and sprocket gearing 43 from the shaft 5′, and upon this shaft 42 I mount an eccentric 44 (Figs. 1 and 10) having a strap 45 pivotally connected at 46 with a sliding arm 47 mounted in guides 48. This arm, as will be apparent, will be moved back and forth in its guides by the action of the eccentric 44, and each of these movements performs one of the functions of the machine. The arm is so formed at its free end as to provide a pusher 49 which engages with the pins 36 to slide the bars 34 and thus, through the rack and pinion connection 35—31 with the fingers 32, actuate these fingers. Furthermore, the arm is formed with a cam jaw 50 adapted upon forward movement to ride over a match book held in its path, and upon retraction to engage such book and discharge it from the disk 15 and into the conveyor F. These parts comprise the discharge mechanism E, the operation of which will be hereinafter more fully explained.

The stop B (Figs. 1, 2, 3, 13, 14 and 15) which, as stated, is used for the purpose of correctly positioning a stack of the cover blanks on the carrier A, comprises a bracket 51 affixed to the stand G and having a boss 51′ on its face and an arm 52 extending over the disk 15. To this arm 52 are attached two gibs or guides 53 between which is slidably arranged a stop-plate 54 having, at its upper end a bearing member 55 carrying an adjusting screw 56 freely rotatable in the member 55 and screw-threaded, as shown at 57, into the arm 52. This adjusting screw permits adjustment of the stop plate vertically with respect to the upper surface of the disk so that only that cover blank of the stack *a* of same which enters the depression 28 of one of the plates 27, and hence lies substantially flush with the upper face of disk 15, can pass beneath the lower end of the stop plate 54. In this manner it will be seen that as the depressions 28 register with the stack of cover blanks *a*, a blank will fall into each depression under the influence of the weight of the stack of blanks, and when the disk rotates the blank so positioned will pass beneath the end of the stop plate 54, and that thus feeding of the blanks one-by-one to the plates 27 will be accomplished.

The match-card feeding, severing and transferring mechanism C (Figs. 1, 2, 3, 6, 7 and 9) comprises a support 58 having a guide abutment 59 and hold-down 60 upon which the long strips of matches, usually comprising one hundred matches are positioned with their head edges toward the right (Figs. 1 and 3) and their uncut or base edges held against the abutment 59. This enables the attendant to feed the strips of matches into engagement with a pair of upper and lower toothed feed rollers 61 so driven by means of pairs of helical gears 62 and 63 from a train of gears 64, 65, 66 (Figs. 1 and 3) intermittently operated upon rotation of the disk 15 to the shaft 16 of which the gear 66 is connected, that upon each rotative movement of the disk 15 the rollers will be moved through an angle including ten tooth spaces, thus feeding ten matches of the strips or cards of matches to the right, Fig. 6.

Mounted upon the shaft 12, (Figs. 2, 6 and 7) is a groove cam 67 with the groove 68 of which cooperates a roller 69 mounted on a vertically sliding plate 70 carrying a knife 71 having a slotted opening 72 through which the match cards are fed. The cam is so set upon the shaft 12 that, when the desired ten matches of the cards have been fed through the opening 72 of the knife, the plate 70 will be lowered, and the knife will shear off or sever these matches from the long strip, thus cutting cards of ten matches each, which is the usual size of card for book-matches.

Also mounted on shaft 12 is a groove cam 73 (Figs. 2, 6 and 8) with the groove 74 of which cooperates a roller 75 mounted upon a cross-head 76 guided by a bracket 77 and by a bushing 78 on shaft 12. Longitudinally adjustable and rotatively mounted in this cross-head 76, by means of the connection 79, is a shaft 80 having attached to it the broad-faced gear 65, by which shaft 80 is rotated, and carrying at its upper end a transfer member 81 fixed to it. This transfer member is provided with four impaling spikes 82 (Figs. 6, 7, 8, 11 and 12) which impale the severed cards of matches in such manner that the cards may be raised and turned by the member 81 under the influence of the cam 73 and gear 65, as will later appear.

The stitching or stapling mechanism D comprises a wire staple forming and inserting machine of known type, but to this machine and actuated by it I have added mechanism for turning over the short or striking-composition end of the cover blank upon the strip end of the match cards. This mechanism includes a slide 83 (Figs. 2 and 3) provided at one end with relatively thin, flat fingers 84 adapted to engage with and turn over the end of the cover blank mentioned. At its other end the slide carries a roller 85 which cooperates with a face-cam 86. The cam and roller impart the operative movement to the slide 83 whereby the fingers 84 are advanced against the end of the cover blank and turn it over upon the match card and the slide is retracted to free the fingers from the card by means of a spring or the like, indicated at 87. Means 88 are provided for adjusting the fingers 84 relatively to the slide 83 in order that they may properly operate upon the cover-blanks.

As hereinbefore indicated, the finished books of matches are discharged by the discharge mechanism E into the travelling conveyor F. This conveyor (Figs. 1, 2, 16, 17, 18 and 19) comprises an endless chain of links 89 pivoted together in the usual manner at 90 and travelling over sprockets 91 and 92. The sprocket 92 is driven step-by-step by means of a shaft 93 on which it is mounted and which carries a bevel gear 94 meshing with a bevel pinion 95 mounted on the end of the intermittently rotated shaft 2. Each link 89 of the conveyor chain is provided with two fins 96, each pair of same forming a compartment in the conveyor for the reception of a match book as the conveyor passes beneath the discharge mechanism E, (see Fig. 10).

Obviously, all of the match books discharged by the mechanism E fall into the compartments of the conveyor with their broad ends in the same relative position, and as, in packing, it is desirable to have every alternate book reversed end-for-end so that the books will stack evenly, I provide the means hereinbefore referred to, for so reversing alternate books during the travel of the conveyor, as will be next described.

Referring now, particularly to Figs. 1, 16, 17 and 18, it will be seen that as the conveyor F travels in the direction of the arrow (Fig. 16) it passes beneath a sweep 97 carried by a shaft 98. This shaft is rotated by means of bevel gearing 99 driven by chain and sprocket gearing 100 from the shaft 42. Each end of the sweep 97 carries a brush 101, and these brushes will alternately, during the rotation of the sweep, remove match books from alternate compartments of the conveyor and push them around in an arcuate channel guide 102 until they again enter the conveyor in compartments thereof which it has previously made vacant. The exit end of the channel guide 102 is provided with a resilient member 103 forming one of its walls, whereby jamming of the match books is prevented. In order to prevent the brushes 101 from disarranging the match books after the latter have been reintroduced into the conveyor by them, I provide a guard 104 overlying the conveyor and match books and over which the brushes ride out of contact with the match books.

As the conveyor F travels around with the sprocket 92, the match books are deposited upon a chute 105 provided therefor and having a slot 106 embracing the sides of the conveyor chain and hence of less width than the length of the match books, whereby the ends of the match books overlying the sides of the chain will be engaged by the bottom of the chute adjacent to the slot 106 and lifted out of the compartments of the conveyor.

As hereinbefore indicated, it is convenient for packaging purposes to have the match books counted out into multiples of twenty-five, and this is readily accomplished, as illustrated in Figs. 2, 18 and 19, by making the follower fin 107 of every twenty-fifth compartment a little longer than the other fins, whereby every twenty-fifth book of matches is pushed a little further along the chute 105 than the other books. This indicates distinctly, as shown at $b$ Fig. 19, the point of separation between multiples of twenty-five books, and leaves a slight space which enables the attendant to readily grasp twenty-five books of matches between the fingers.

The mechanisms hereinbefore described for turning alternate match books end-for-end, and for counting the match books off in predetermined multiples, form the subject-matter of my application for patent for transfer mechanism for book match machines, filed June 6, 1929, Serial No. 368,969, which is a division of this case.

The operation of the machine is, essentially, as follows:—

It is to be noted that the disk 15, in making a complete revolution is given eight successive, intermittent, rotary impulses by the Geneva gear 1 described. Four of these impulses bring the plates 27 of the disk into operative relation to the stations at which the mechanisms B, C, D and E are located, and the other four impulses bring the plates 27 to intermediate stations I, II, III and IV which are idle stations at which no operation is performed upon the match books. This mode of operation has a two-fold purpose; first, it enables me to load more cover-blanks and cards of matches upon the disk, and hence increases the output of the machine; and second, it obviates the necessity for turning the disk through an angle of 90° and abruptly stopping it, with the jar to the working parts, and the possibility of failure of exact register which would probably be incident thereto.

With these characteristics in mind, it will be understood that the first step in the operation of the machine is to arrange a stack of cover-blanks upon the disk 15, as shown at $a$, Figs. 13 and 14, with their long edges against the stop-plate 54 and their ends, which carry the striking composition, against the boss 51', all of the blanks being so positioned with their unprinted or plain faces up.

The next step is to take two long strips of matches and superpose them upon the support 58 with their strip or uncut edges lying against the guide abutment 59 and lying under the hold-down 60. These cards of matches are then advanced toward the feed rollers 61 until they are in operative engagement therewith.

The machine being now ready, the means from which power is transmitted to the pulley 11 is started. This immediately, through the pinion 9 imparts power to the gear 8 and the clutch member 7 carried thereby and renders the machine ready to function as soon as the parts of the clutch 6—7 are engaged. The clutch being now engaged, motion will be imparted to all of the operative parts of the machine.

Taking the station B as a starting point, the first movement of the carrier A under the influence of the Geneva gear 1 will be from station B to station I and the depression 28 of one of the plates 27 will carry along with it, in proper position, the lowermost blank of the stack of cover-blanks $a$ the superposed blanks being retained by the stop-plate 54. As the carrier A moves from B to I, the feed rollers 61 feed the match strips forward a distance equal to ten matches, it being apparent that the teeth of the rollers engage the splints of the matches of the two cards as they would the teeth of a double rack. At the same time, but in proper timed relation, the transfer member 81 will be rotated and lowered by means of the gears 66 and 65 and the cam 73 and its connections, respectively, and the spikes 82 will impale the cards of matches, as shown particularly in Fig. 6. Also at this time, but during the dwell of the carrier A, the knife 71 will be lowered by means of its connections with the cam 67, and will sever the cards of ten matches from the long strips or cards thereof.

The next step of movement will advance the carrier from station I to station C. Of course, as each plate 27 leaves the station B it will carry with it in its depression 28 a cover-blank. Thus as the carrier advances the first-mentioned cover-blank from I to C another cover-blank will be presented at I, the transfer member 81 will be raised and rotated through 180° and lowered and the match strips will be moved forward the distance of ten matches, as before, and the cards of ten matches severed and impaled.

Obviously as the transfer member 81 is raised, rotated through 180°, and lowered, it carries on its spikes 82 the match-cards previously severed, and positions them upon the cover-blank c, Fig. 12, as shown. During the dwell of the carrier, the arm 47 is moved forward and back, and in its forward movement its end 49 strikes against the pin 36 and moves the slide bar 34 in line with it and with station C thus causing the racks 35 to rotate the pinions 31 and operate the pairs of fingers 32 actuated thereby. The pair of fingers adjacent to station C will operate, as shown in dotted lines, Fig. 12, and in full lines, Fig. 11, to turn up the long end of the cover-blank c, and then fold it down upon the matches held upon it by the transfer member 81. At the same time that the fingers 32 adjacent to C are actuated, the fingers 32 adjacent to E are moved from the position shown in dotted lines to the position shown in full lines, Fig. 10. By reference to Fig. 4, and the description of the slide bars 34 and their associated parts, it will be seen that the fingers are held in the positions to which they are moved, by means of the spring toggles 38 acting upon the bars 34. Thus, when the fingers 32 at C have turned down the ends of the cover-blanks c upon the matches they will be retained in this position and will hold the thus-far formed match book in proper position upon the carrier.

The operations described are carried on in regular order, a cover blank presented at C being supplied with cards of matches (two superposed cards of ten matches each) and folded over upon them, upon each successive movement of the carrier, and we will therefore assume that each plate 27 of the carrier, as it leaves station C carries a thus partially assembled match book.

These partially assembled books, as they stop at station D are completed by folding the short end of the cover over upon the long end previously folded, and stitching or stapling through the short end of the cover, the strip end of the match cards, and the back of the cover, automatically by means of the stitching or stapling machine and the folding fingers 84 actuated in conjunction therewith, as described.

After the match books have been finished at station D they move to station III and then to station E where, when the arm 47 moves forward to operate the fingers 32 its cam lug 50 will ride over them, and when it returns will pull them with it out upon the bridge-piece d, which is narrow, and off of which they topple sidewise into the compartments of the travelling conveyor F which is moved in timed relation to the stroke of the arm 47, by the mechanism described.

As the conveyor F progresses toward the discharge end of the machine, the match books are operated upon by the sweep 97 to turn them alternately end-for-end, as described.

After this operation the match books are discharged upon the chute 105, as shown particularly in Fig. 19, from which they are taken and packaged in any approved manner.

It will thus be seen that I provide a machine capable of continuous operation so long as it is supplied with cover-blanks and strips or cards of matches, and that all of the operations of the machine are automatic, thereby necessitating very little attention on the part of an attendant.

Various changes are contemplated as within the spirit of the invention and the scope of the following claims.

What I claim is:—

1. In a machine for assembling book matches, a movable carrier, means associated with said carrier for feeding cover-blanks thereto, means for positioning cards of matches upon said cover blanks, means for folding said cover-blanks into partial book form upon said cards of matches, means for completing the folding of said covers means for uniting said covers and cards of matches, and means for discharging the finished match books from said carrier, said first mentioned folding means being actuated by said discharge means.

2. In a machine for assembling book matches, a rotatable disk carrier, means associated with said carrier for feeding cover-blanks thereto by gravity, means for positioning cards of matches upon said cover blanks, means for folding said cover-blanks into partial book form upon said cards of matches, means for uniting said covers and cards of matches, and means for discharging the finished match books from said carrier, said folding means being actuated by said discharge means.

3. In a machine for assembling book matches, a horizonally arranged intermittently rotatable disk carrier, means associated with said carrier for feeding cover-blanks directly thereto by gravity, means for positioning cards of matches upon said cover blanks, means for folding said cover-blanks into partial book form upon said cards of matches, means for uniting said covers and cards of matches, means actuated by said uniting means for completing the folding of said covers prior to the uniting operation, and means for discharging the finished match books from said carrier, said partial folding means being actuated by said discharge means.

4. In a machine for assembling book matches, an intermittently rotatable horizontally arranged disk carrier, means associated with said carrier for feeding cover-blanks directly thereto by gravity, means for feeding strips of matches and severing same into match cards, means associated with said feeding and severing means for transferring said cards of matches to the cover-blanks fed to said carrier, means for folding the cover-blanks into partial book-form upon said cards of matches, means for permanently uniting said covers and cards, means actuated by the uniting means prior to the uniting operation for completing the folding of the covers into book form, and means for discharging the finished match books from said carrier, said discharging means serving to actuate said first mentioned folding means.

5. In a machine for assembling book matches, an intermittently rotatable carrier, means for feeding cover-blanks to said carrier, means for positioning cards of matches upon said cover-blanks, means for folding said covers into book form upon said match cards including pivoted fingers, means for uniting said covers and cards, and means for discharging the finished match books from said carrier including a reciprocable arm adapted upon movement in one direction to actuate said fingers to fold said covers, and upon movement in the opposite direction to engage a finished match book and discharge it from said carrier.

6. In a machine for assembling book matches, an intermittently rotatable carrier disk, means for feeding cover-blanks to said disk, means for positioning cards of matches upon said cover-blanks, pivoted fingers carried by said disk, means carried by said disk and connected with said fingers and operable to impart pivotal movement to said fingers to cause same to fold the cover-blanks upon the match cards, means for uniting said covers and cards, and means operated in timed relation to the rotation of said disk for actuating said finger operating means and for discharging finished match books from said disk.

7. In a machine for assembling book matches, a carrier disk provided with a plurality of pairs of diametrically arranged means for receiving the parts of match books, means for feeding cover-blanks and match cards to said receiving means, means associated with each of said receiving means for folding the cover blanks upon the match cards and thereafter acting to clamp the thus folded blanks and cards upon the receiving means, members carried by said disk for simultaneously operating said folding and clamping means of each pair of receiving means, a stitching machine for uniting the covers and cards of matches, and means for discharging the finished match books from said carrier disk including a device for actuating the members which operate the folding and clamping means, whereby a cover-blank may be folded by one member of a pair of said means and a finished book released by the other member of said pair, said device serving also to move the finished book to discharge position.

8. In a machine for assembling book matches, a rotatable carrier disk, a plurality of pairs of diametrically arranged receiving plates mounted in said disks, a depression in the upper face of each of said plates of dimensions to accommodate a cover-blank, folding and clamping fingers pivoted adjacent to said plates, a plurality of slidable members carried by said disk and furnishing means whereby pivotal movement may be imparted to said fingers, resilient means for maintaining said slidable members in one or the other of two positions, and means operated in timed relation to the rotation of said carrier disk for imparting sliding movement to said slidable members.

9. In a machine for assembling book matches, an intermittently rotatable carrier disk, a plurality of plates carried by said disk, each of said plates provided upon its upper face with a depression substantially corresponding in width and depth with the width and thickness of a cover-blank, means for positioning a plurality of cover-blanks in such relation to said disk that as the latter rotates each of said depressions will receive a cover-blank, means actuated in timed relation to the rotation of said disk for severing match cards from a strip of matches, means actuated in timed relation to the rotation of said disk for transferring said cards from said severing means and positioning them upon said cover-blanks, means carried by said disk for folding said cover-blanks upon said cards, a device for finishing and stapling the match books, and means for discharging the finished match books from said carrier disk and for actuating said folding means.

10. In a machine for assembling book matches, a rotatable carrier, means for imparting step-by-step rotation to said carrier, means for feeding cover-blanks to said carrier as it rotates, mechanism for severing a strip of matches into match cards of predetermined length including a knife actuated in timed relation to the rotation of said carrier and means for feeding said strip of matches geared to said carrier and intermittently rotated simultaneously therewith, means for transferring said cards of matches from the severing means to and positioning them upon the cover-blanks fed to the carrier including a reciprocable and rotatable transfer member geared for rotation to said carrier, means for imparting reciprocation to the transfer member simultaneously with its rotation, means for folding one end of said cover-blanks upon said match cards while the carrier is stationary and for clamping the thus folded cover-blanks and the match cards therein upon the carrier while the carrier is rotated, means for folding the other end of said cover-blanks upon the match cards and upon the previously folded end of the cover-blanks, means for fastening the covers thus formed to the match cards, means for discharging the finished match books from the carrier and operative to actuate said first-mentioned folding means, a travelling conveyor into which the finished books are discharged, and means for imparting a step-by-step movement to said conveyor simultaneously with the movement of said carrier.

In testimony whereof I have hereunto set my hand this 4th day of April, A. D. 1927.

LUCIAN E. PARKER.